United States Patent

Gueldenpfennig et al.

[15] 3,646,277

[45] Feb. 29, 1972

[54] METHOD AND APPARATUS FOR IDENTIFYING PATHS THROUGH A SWITCHING NETWORK

[72] Inventors: Klaus Gueldenpfennig; William Hastings, both of Rochester, N.Y.

[73] Assignee: Stromberg-Carlson Corporation, Rochester, N.Y.

[22] Filed: Dec. 18, 1969

[21] Appl. No.: 886,067

[52] U.S. Cl. .......................... 179/18 J, 179/8 A, 179/18 FH, 179/175.2 C, 179/175.21

[51] Int. Cl. ........................................ H04m 3/22, H04q 3/72

[58] Field of Search ................. 179/175.2 C, 175.24, 175.23, 179/175.21, 8 A, 17 A, 18 FH, 27 G

[56] References Cited

UNITED STATES PATENTS 3,115,549 12/1963 Lamneck et al. ...................... 179/8 A 2,981,806 4/1961 Middaugh ...................... 179/175.2 C

*Primary Examiner*—Kathleen H. Claffy
*Assistant Examiner*—Thomas W. Brown
*Attorney*—Charles C. Krawczyk

[57] ABSTRACT

A telephone system including a switching network wherein memory circuits are provided for each of the links in the switching network to identify and select cross-points for providing connections through the switching network. Each link that forms a portion of a connection through the network is assigned a time slot corresponding to that assigned to its connected junctor circuit. The cross-points in each connected link of a particular connection are identified by scanning the memory circuits of the links assigned to a common time slot.

18 Claims, 3 Drawing Figures

KLAUS GUELDENPFENNIG
WILLIAM HASTINGS

INVENTOR.

BY

Charles C. Krawczyk

ATTORNEY

INVENTORS
KLAUS GUELDENPFENNIG
WILLIAM HASTINGS
BY
Charles C. Krawczyk
ATTORNEY

KLAUS GUELDENPFENNIG
WILLIAM HASTINGS
INVENTOR.

BY Charles C. Krawczyk

ATTORNEY

METHOD AND APPARATUS FOR IDENTIFYING PATHS THROUGH A SWITCHING NETWORK

BACKGROUND OF THE INVENTION

This invention relates in general to systems for identifying paths through switching networks, and more particularly to telephone switching systems wherein provisions are made for facilitating the localization and identification of network cross-points that are used in establishing and/or are connected in established calls.

The presently available systems for locating and identifying various faulty switching network components in telephone common control systems require that a connection check is made during the time the connection is being established through the switching network. If the connection fails, a printout is made of some of the components used in the attempted connection. At times, a pilot tone is applied to a completed connection to determine whether or not a faulty connection was made. However, the present systems only provide information on junctor circuits, trunk circuits and subscriber circuits, and the cross-points directly associated therewith, but do not provide any means for identifying the particular cross-points throughout the entire switching network. Maintenance men are thereafter required to reestablish the cross-points of the faulty connection on a step-by-step trial basis.

Furthermore, the presently available maintenance systems for common control systems are only capable of providing information on only portions of the connections that fail to be completed. Once a connection is completed, the common control equipment used in setting up the connection is released, and there is no way of later identifying the various components used in the connection should problems appear in the connection after it has been completed, such as for example, hum, cross talk, poor cross-point connections, etc. In the case of problems appearing after the connections are completed, the subscriber can notify the operator of the same and the operator will, in turn, notify the maintenance department which, in turn, can only try to reestablish the connections on a step-by-step trial basis in an attempt to locate the source of trouble. This is a time-consuming and expensive procedure. It would, therefore, be highly advantageous to have a telephone system including an automatic maintenance system for common control systems wherein the particular cross-points used in completing a call and/or used in a completed call, can be readily identified at the request of the operator.

In addition to the foregoing, none of the prior art common control systems include means for providing a complete analysis of the traffic through the switching network on a cross-point basis, since the information pertaining to a call is released immediately after a connection has been completed, and the information used in completing a call does not identify all the cross-point connection used through the network. It would, therefore, also be highly advantageous to provide an automatic traffic analysis system for common control equipment for providing a completed analysis of all the connections involved in paths through the telephone network, the duration of such connections, and the traffic through various components in the network.

The presently available computer controlled telephone systems require a memory circuit to include information pertaining to the particular cross-points involved in connections, information pertaining to routing, and information pertaining to the manner in which the cross-points are associated in a connection. These types of computer controlled systems require an extremely large and expensive memory circuit in order to be able to retain all this information. As a result, it has been found that the computer controlled telephone systems are not economically feasible for use in the small and medium size telephone exchanges.

It is, therefore, an object of this invention to provide a new and improved method and apparatus for identifying all cross-points used in establishing a connection through a matrix switching network.

It is also an object of this invention to provide a new and improved method and apparatus for identifying all cross-points used in establishing a connection through a matrix switching network that is economically feasible for use in all sizes of telephone exchanges.

It is also an object of this invention to provide a new and improved method and apparatus for identifying cross-points used in making telephone connections, and also identifying the cross-points after the connections were completed and the common control equipment released.

It is a further object of this invention to provide a new and improved method and apparatus to facilitate the identification of components involved in telephone network connections by providing means whereby a permanent record can be made of the various matrix cross-points used in establishing the connections.

It is also an object of this invention to provide a new and improved maintenance system for telephone switching systems by providing means for identifying particular cross-points used in establishing connections that failed to complete, as well as identifying the cross-points used in completed connections.

It is still a further object of this invention to provide a new and improved maintenance system for telephone switching systems wherein a permanent record can be made of the various matrix cross-point connections used in establishing faulty connections along with an indication of the type of fault.

It is also an object of this invention to provide a new and improved method and apparatus for analyzing the traffic through telephone switching networks by identifying all of the cross-points involved in connections through the switching network.

BRIEF DESCRIPTION OF THE INVENTION

Method and apparatus are provided for identifying the matrix ports and cross-points involved in connections through a matrix type of switching network. The method and apparatus provide information for trouble and maintenance purposes, and/or information for analysis of traffic through the switching network.

The identity of the cross-points involved in connections is continuously stored in memory means during and after the set up of the connections. Ports in matrix switches involved in a common path through the network are allotted a separate timing pulse in a timing sequence. The ports are scanned and identified in a sequential order. When a port allotted a selected timing pulses is scanned, the identity of the port, and the identity of the cross-point connected to the port, involved in the connection, are stored.

A further feature of the invention provides for identifying the selected timing pulse and storing the identity of the timing pulse.

A still further feature of the invention provides for storing a digital code for identifying the particular common path through the network.

When the method and apparatus of the invention are used for maintenance purposes, the information pertaining to the matrix switch ports and cross-points in a common path is provided when requested. Means are provided for storing a code designating the type of problem involved.

When the method and apparatus of the invention are used for traffic analysis, the information pertaining to the matrix switch ports and cross-points connected in common paths through the network is provided on a continuous sequential basis. Means are provided for identifying the information as traffic analysis data.

DESCRIPTION OF THE PREFERRED EMBODIMENT

Figure 1:
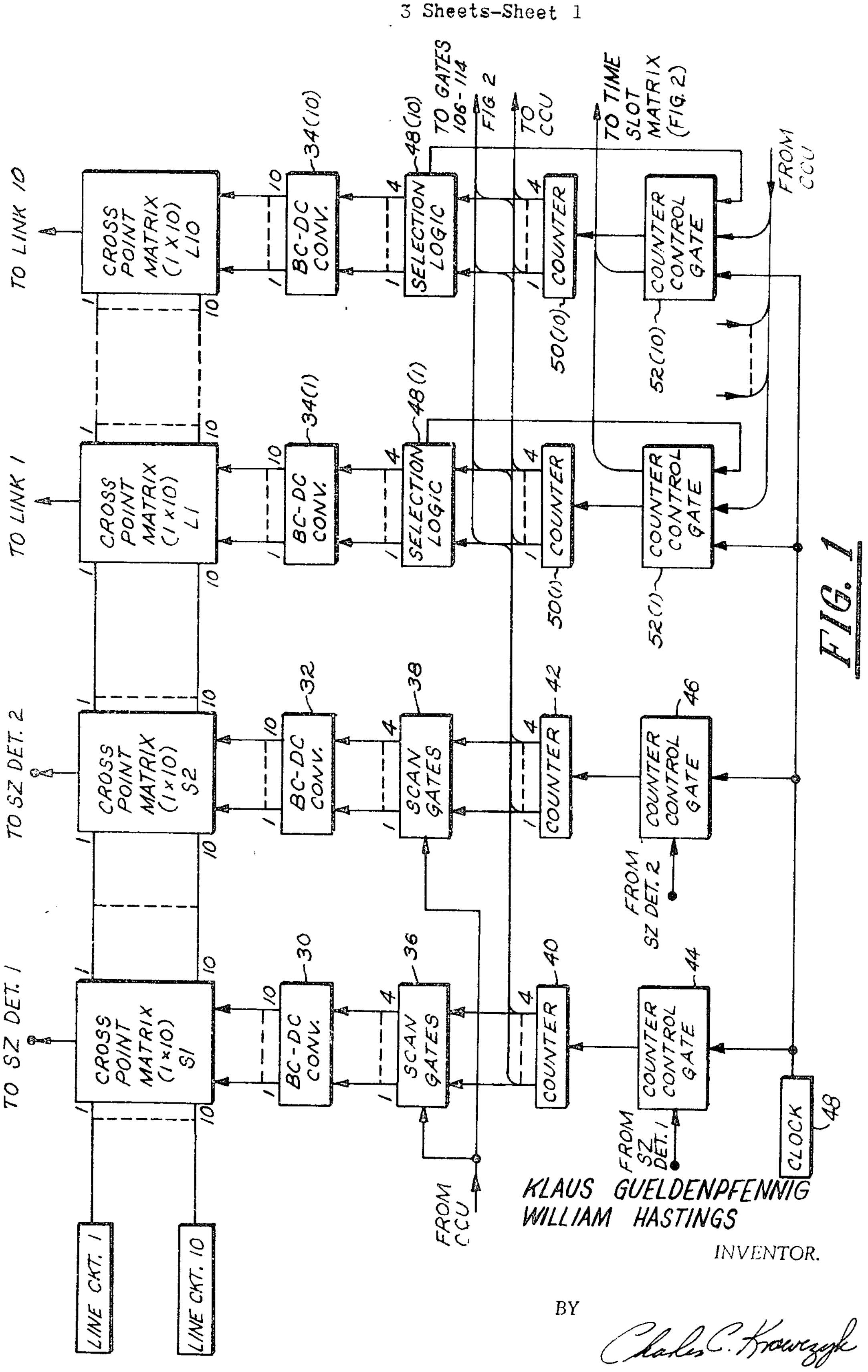
FIG. 1 is a simplified block diagram of a portion of a telephone switching network adapted to be connected to the cross-point identification system of the invention.

A single matrix switch of a telephone switching network is illustrated in FIG. 1 that comprises, for purposes of illustration, twelve individual 1×10 matrices (S1, S2 and L1–L10) that form a 12×10 matrix switch. A matrix switch generally includes two separate groups of ports that provide the input and output connections to the matrix cross-points or switches, which, in turn, interconnect (when activated) various ports of one group to various ports of the other group. One group of ports (1–10) (illustrated as horizontal in FIG. 1), are connected to individual line circuits. The other group of ports (SZ1, SZ2, LINK 1–LINK 10) are connected through links to ports of other matrix switches or to seize detectors. Each of the cross-point matrices is similar and comprises a 1×10 matrix (one vertical port and 10 horizontal ports). One switching element in each matrix is provided for each horizontal port connected to each line circuit, for connecting any of the line circuits to the common vertical port. This matrix is exemplary of any 1×$n$ matrix. The number of bits in the counter or memory which controls the matrix (to be described in detail hereinafter) will depend on the magnitude of $n$. The arrangement of switching elements may be considered as being such that each switching element corresponds to a separate line circuit. As indicated schematically in the drawing, all of the line circuits are connected in multiple to all of the horizontal ports of the S1, S2 and L1 through L10.

The switching elements themselves may be, for example, four-wire cross-point switches, each element having four transistors, two for the send pair and two for the receive pair or a relay with four contacts and a suitable drive circuit may be used. Each switch element may be a module having four transistor cross-points which are triggered simultaneously to operate the switch element and provide a connection from its corresponding line circuit to the link associated with the matrix port in which the switch element is connected. The cross-point matrices S1 and S2 are connected to seize detectors which may be frequency responsive devices responsive to AC tones generated by the line circuits when they require service (viz the subscriber connected thereto goes off hook). Alternatively, if DC signalling is used to seize, the detectors may be DC detection circuits or relays. A pulse is provided by the seize detectors to the control circuits of their respective scanning matrices.

The control system operates on a binary basis. Inasmuch as the cross-point matrices are 1×10 arrays, a binary-to-decimal conversion is required to selectively and sequentially operate the individual switch elements of the matrices. To this end, a binary code-to-decimal converter is connected to each cross-point matrix. The converters translate binary inputs on four input lines into a decimal (1 out of 10) code on any one of 10 output lines. The output lines are connected to the individual switch elements in the matrices. The converters are all similar. BC–DC converter 30 is connected to the scanning matrix S1. Another similar converter 32 is connected to the matrix S2. Similar converters 34(1) to 34(10) are connected to each of the link matrices L1 through L10.

The control system also includes, in the case of the control system for the scanning matrix, scanning gates 36 and 38, binary counters 40 and 42 and counter control gates 44 and 46. Pulses for advancing the counters are obtained from a clock pulse source 48 which may have a relatively high frequency, say 480 kHz. The control system for the scanning matrices are similar. It may be desirable for the scanning matrix control system to use a separate clock having a different frequency to accommodate the operating speed of the seize detectors. Two scanning matrices are used in order to increase the switching speed of the stage. However, only one scanning matrix may be used if faster switching speed can be accommodated.

Each matrix L1 through L10 includes a link selection control which also provides link memory counters 50(1)–50(10). This link selection is provided by a selection logic circuit 48(1) to 48(10). Binary counters 50(1) to 50(10) are also included. The count stored in these counters are transferred through the selection logic to their respective converters for operating selected switch elements in the matrices. Different counts in the counters correspond to different switch elements in their associated matrices, such that the count stored in the counter provides link memory as to the switch element which is connecting a line to the various links. Counter control gates 52(1) to 52(10), one for each matrix L1 to L10, enable the clock pulses from the clock source 48 to be applied to the counters 50. The counters 40 and 42 are connected to the counters 50 in the link selection system. Also, the counters are connected to the common control unit associated with the electronic switching system in order to provide information respecting busy links. In addition, the information as to the switch elements which provide the individual links is connected to the identification system of FIG. 2 for fault detection and traffic analysis purposes. The counter control gates 52 also receive inputs from the common control unit in order to enable connections to free links, as service is desired from successive subscribers.

In operation, the counter control gates 44 and 46 are normally enabled in the absence of an inhibit level from their associated seize detectors. The clock pulses then continuously advance the counters at high speed. The counters have feedback (viz the fourth or last flip-flop stage being connected to the first stage), such that they cycle continuously. The scanning gates 36 and 38 transfer the counts to the converters 30 and 32 connected thereto. Each of the gates 36 and 38 has an input from the common control unit. The common control unit has storage for busy lines. When the count in either the counter 40 or 42 corresponds to a busy line, inhibit pulses are applied to the gates in the scanning gates 36 and 38, such that those counts are inhibited from being transferred from the counters 40 and 42 to the converters 30 and 32.

As successive output pulses on lines 1–10 of the converters (except for those of the 10 converter output lines corresponding to line circuits which are busy) are produced, the switch elements corresponding thereto are operated. Thus, for example, when a pulse is produced on output line 1 from the converter 30, the first switch element which is associated with line circuit 1 is closed. In the event that the line circuit was busy, the inhibit pulses from the common control (CCU) would preclude the generation of a pulse on output line 1 of the converter 30. This eliminates clicks and other noise in the subscriber circuit connected to line circuit 1. The counters 40 and 42 run asynchronously. Accordingly, pulses generally appear on different output lines of the converters 30 and 32 at the same time. Accordingly, connections may be made more rapidly through the use of the two scanning matrices S1 and S2 than would be the case if only one scanning matrix were used.

When a line circuit marked as requiring service is connected to an operated switch element, a marking tone, or a mark level, say ground is applied to one of the seize detectors. Thus, for example, a marking tone on line circuit 1 would be applied through the first switch element when it is operated to seize detector 1. Note that the counter 40 is simultaneously storing a count corresponding to the first switch element in matrix S1. The inhibit pulse provided by the seize detector thereupon inhibits the counter control gate 44. Thus, clock pulses are prevented, during the duration of the seize detector pulse, from being applied to the counter 40. The counter then remains at a count corresponding to the operate switch element in matrix S1.

The common control system CCU operates to transfer this count to one of the counters 50 in the link memories via counter control gates 52 for one of the link matrices L1 to L10 which is associated with a free link. A connection is then made through the cross-point switch element in the matrix for that free link corresponding in location to the operated cross-point switch element in the matrix S1. Consider that link circuit 1 is free, an enable level is then applied from the CCU to the counter control gate 52(1) in the control for matrix L1. The clock pulses are then applied through the enabled counter control gate 52(1) so as to advance the counter 50(1). The count in the counter 50(1) is compared with the count stored in the counter 40 in the selection logic 48(1). When the count in the counter 50(1) corresponds to the count in the counter 40, an inhibit level is fed back from the selection logic 48(1) to the counter control gate 52(1), thereby inhibiting the transfer of additional clock pulses to the counter 50(1). The selection logic 48(1) in then operated to transfer the count in the counter 50(1) to the converter 34(1). An output on line 1 of converter 34 is then produced which operates the first cross-point switch element, thereby connecting the matrix port connected to line circuit 1 to the matrix port connected to the link 1. The next link connection will be made through the next free cross-point matrix L2.

The scanning matrix S2 is free running while the connection is made through the matrix S1 to link 1. The seize detector 2 connected to the scanning matrix S2 detects the next line circuit requiring service. The count stored in the counter 42 is then transferred to the counter 50 in the link memory for the next free link and operates the cross-point switch in the next free link matrix L2 to L10 to provide the connection to the next free link. Since the seize detection pulse is of duration only long enough to provide for operation of a cross-point switch element, transmission paths may be connected very rapidly. Scanning of line circuits to detect those requiring service can occur during time periods which overlap with the periods of time required to make connections to free link circuits. Accordingly, the switching system is extremely rapid in operation. A switching system of the type illustrated in FIG. 1 is more fully explained in a copending U.S. Pat. application entitled "Telephone Switching System," Ser. No. 785,896, filed on Dec. 23, 1968, for Klaus Gueldenpfennig and is assigned to the assignee of the present patent application.

Although separate control circuits (counter, selection logic or scan gates, and BC–DC converters) are shown and described as associated with matrix ports connected to links or seize detectors, it is to be understood, that such control circuits can also be provided on the line circuit side of the matrix switch (instead of links) and the required switching can be controlled from the line side of the matrix. Furthermore, it is to be understood that the control circuits for various matrix switches in the various matrix stages in a telephone switching network can be connected in any feasible combination, to control switching from the link side of the matrix switches, from the line side, from the junctor side, and any combination thereof.

During the time the connections are being made, and while the connections remain completed, the counters 50(1)–50(10) provide a memory function for identifying the particular links or matrix ports and the particular cross-points connected to the link or matrix ports that are being used to establish the connections through the matrix switch. Thus, for example, if one of the parties connected through the telephone switching system notifies the operator that the connection is noisy, or has excessive hum or crosstalk, or in the event the connection failed to be completed during set, the link or port memories associated with the connection (counters 50(1) – 50(10) in the stage shown in FIG. 1 and other counters for successive matrix stages) can be read out into a printout device with the use of the system disclosed in FIG. 2.

Figure 2:
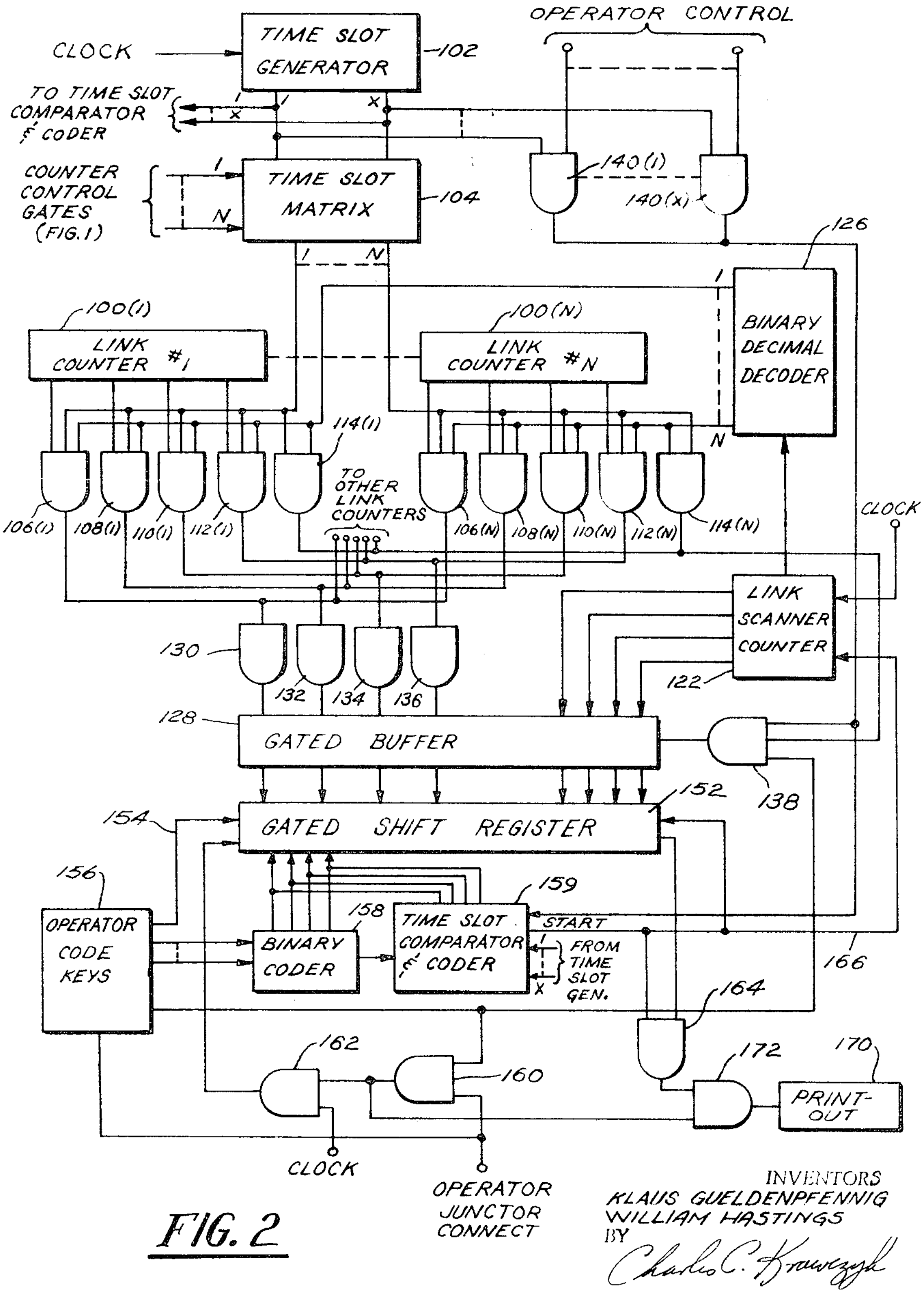
FIG. 2 is a block diagram of the cross-point identification system of the invention used in identifying the matrix switch ports and cross-points involved in establishing connections in switching systems of the type disclosed in FIG. 1.

The system of FIG. 2, at the request of the operator, or automatically, provides a record of the particular cross-points and ports in the various matrix stages of a switching network of the type illustrated in FIG. 1 involved in establishing, and/or maintaining, the connections. A separate counter circuit 100(1) – 100(N) (that corresponds to the counters 50(1) – 50(10) in FIG. 1) is provided for each matrix port of one of the two groups of matrix ports (horizontal or vertical) in each of the matrix switches in the various stages of the telephone switching network. When the connections for a call are being set up, a separate junctor circuit is seized for each call through the switching network. Each junctor circuit is wired to be designated by a separate time slot signal from a time slot generator 102. The time slot generator 102 generates a plurality of sequential time pulses (time slots) TS(1) – TS(X) wherein the number (X) corresponds to the number of junctor circuits in the telephone switching system. When the connections are being made through the telephone switching system the particular matrix ports used along with a seized junctor circuit are allotted the same time slot as that of the junctor circuit via a time slot matrix switch 104. When a particular matrix port is selected via various links for connection to form a transmission path with a junctor circuit, a signal from its corresponding counter control gate 52 (FIG. 1) switches a cross-point connection in time slot matrix 104 so that the time slot of the particular junctor circuits seized (TS(1) – TS(X)) is applied to the corresponding counter output AND-gates 106–114. The AND-gates 106–114 are provided for each link counter circuit 100(1) – 100(N). The AND-gates 106–112 are connected to receive the binary counts in the connected counter circuit.

Figure 3:
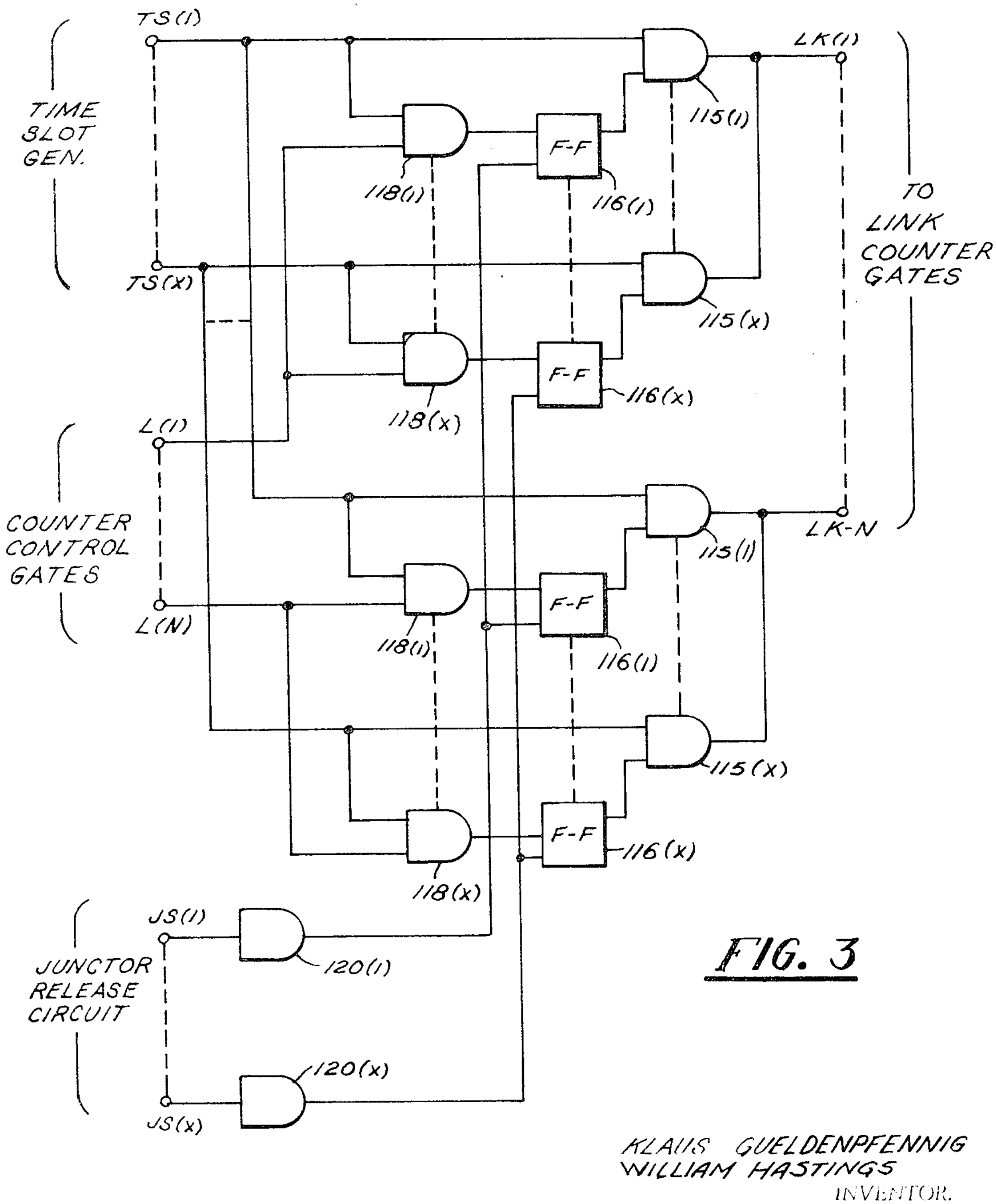
FIG. 3 is an embodiment of a logic diagram for the time slot matrix of FIG. 2.

An embodiment of the time slot matrix 104 is illustrated in FIG. 3. For purposes of simplifying the explanation of the time slot matrix, only the circuits used with two time slots TS(1) and TS(X) and two link port input and output terminals L(1) and L(N), and LK(1) and LK(N), respectively, are illustrated. However, it is to be understood that a complete matrix circuit would include a similar circuit duplicated for each of the time slots TS(1) – TS(X) and each of the link counters 100(1) – 100(N).

A separate AND-gate 115 is provided for each combination of time slots and link counters. One input of the AND-gate 115 is connected to receive its respective time slot pulses, while the other input is connected to an output circuit of a flip-flop 116. The flip-flop 116 is set by a signal from an AND-gate 118. One input circuit of the AND-gate 118 is connected to receive its corresponding time slot pulses while the other input circuit is connected to be enabled from a signal from its counter control gate circuit 52 via terminals L(1) – L(N). The flip-flops 116 are connected to be reset when the junctor circuit having the same time slot is disconnected, wherein a reset signal is applied via the corresponding terminal JS(1) – JS(X) and an inverter circuit 120(1) – 120(X). The flip-flops 116(1) are connected to be reset via the AND-gate 120(1) and the flip-flops 116(X) are connected to be reset via the AND-gate 120(X).

For purposes of illustration, assume that link counter 100(1) was selected for connection to a junctor circuit that is designated by the time slot TS(1). A pulse from the counter control gates 52(1) timed by the common control unit (CCU) to be synchronized with the time slot pulse TS(1) will set the flip-flop 116(1) via the AND-gate 118(1). When the flip-flop 116(1) is set, the connected AND-gate 115(1) is enabled to pass the time slot pulses TS(1) to the AND-gates 106(1) – 114(1) of the connected link counter 100(1). These time slot pulses will be periodically applied to the AND-gates 106(1) – 114(1) until a reset pulse is applied via the terminal JS(1) indicating that the junctor circuit has been disconnected and resets the flip-flop 116(1) via the invertor 120(1). As can be seen, any of the link counter gates 106–114 can be connected through the time slot matrix 104 to receive any of the time slot enabling pulses TS(1) – TS(X) that correspond to the connected junctor circuit, and will vary from connection to connection.

The individual counter circuits 100(1) – 100(N) are periodically scanned by a scanning system including a link scanner counter circuit 122, and a binary-decimal decoder 126. The link scanning system provides a systematic means for scanning for the particular links and the cross-points being used in a particular connection. Binary pulses from the link scanner counter 122 are applied to a gated buffer circuit 128 and also to a binary-decimal decoder 126. The decoder 126 provides a number of sequential scanning pulses (N) corresponding to the number of link counter circuits 100(1) – 100(N). The scanning pulses from the decoder 126 are applied to the input circuits of the gates 106–114 in a manner so that the gates corresponding to the link counters 100(1) – 100(N) are enabled and disabled in sequence.

The output circuits of the AND-gates 106–112 are connected to the gated buffer circuit 128 via inverter circuits 130–136, respectively, to apply (when enabled) the count stored in the link counters into the gated buffer register. The gated buffer circuit 128 is controlled to accept data only when enabled by an AND-gate 138.

In the event of trouble in one of the calls through the telephone switching network, the operator's attention is directed to the problem and to the junctor circuit used in the connection. The operator then selects one of the gates 140(1) – 140(X) corresponding to the junctor circuit used in the connection being investigated. The corresponding time slot (TS) of the connecting junctor circuit is now transmitted from the time slot generator 102 through one of the gates 140(1) – 140(X) to the gate 138 to apply one of the enable signals during the selected time slot. The gates 106–114 are now scanned once for each time slot. Another input circuit of the AND-gate 138 is connected to each of the output circuits of the AND-gates 114 to receive another enable signal when a link counter 100(1) – 100(N) receiving the selected time slot pulse is scanned. The third input circuit of the gate 138 is coupled to the operator trouble code keys 156 to receive the third enable signal when the operator requests a printout. Hence, the gated buffer circuit will not accept any signals until three conditions are present: 1) the operator request a printout, 2) the time slot is present, and 3) a link counter allotted the time slot from the time slot matrix 104 is scanned. When the conditions are present, the gated buffer will accept information for identifying the particular link counter from the link scanner counter 122 and information for identifying the cross-point from the scanned link counter.

The output of the gated buffer circuit 128 is coupled to a gated shift register 152. The gated shift register is a conventional circuit for receiving data at controlled (gated) periods of time that can be serially shifted within the register and later out of the register in response to clock pulses. The gated shift register 152 is first gated on by a signal from the operator code keys 156 via line 154. When an operator receives an indication of trouble, such as failure to complete the connection, or excessive hum, cross talk, etc., the operator depresses a code key corresponding to the type of trouble. Simultaneously, the corresponding junctor gates 140(1) – 140(X) are enabled automatically when the operator is connected to the junctor circuit. The various code keys, when depressed, cause a binary coder circuit 158 to apply a binary code to the gated shift register 152 designating the particular type of problem in the connection.

After the trouble code is applied to the shift register 152, the binary coder 158 enables a time slot comparator and coder circuit 159. The time slot comparator and coder circuit 159 receives the time slot pulses TS(1) – TS(X) from the time slot generator 102 and also the selected time slot pulse from the gates 140(1) – 140(X). The time slot comparator and coder circuit 159 conventionally compares the occurrence of the selected time slot pulses with the pulses from the time slot generator to identify the selected time slot pulse, and applies a binary code identifying the corresponding junctor circuit into the gated shift register.

At the time the operator depressed a code key, the printout signal was also applied to the one input circuit of the AND-gate 138 partially enabling the gate. The printout signal is also applied to an input circuit of an AND-gate 160. The other input circuit of the AND-gate 160 is connected to receive an enable signal when the operator connection to the selected junctor circuit was completed. When both enable signals are present, the AND-gate 160 enables an AND-gate 162 to pass clock pulses to the gated shift register 152 to allow the data received by the register to be shifted out to an input circuit of an AND-gate 164. In addition, after the binary code corresponding to the selected junctor circuit is applied to the shift register 152, a start signal is applied from the time slot comparator and coder circuit 159 via the line 166 to enable the gate 164 to pass the data from the shift register 152 to a printout device 170 via an AND-gate 172 (which was previously enabled by a signal from the AND-gate 160). The start signal is also applied to the link scanner counter 122 to initiate link scanning and is also applied to the gated shift register 152 to enable the shift register to accept data from the gated buffer circuit 128.

In operation, when a call fails to be completed, or an operator is recalled by a connection party, the operator will be connected to the junctor serving the particular connection having the fault and will enable the corresponding AND-gate 140(1) – 140(X) and applies an enable signal to the AND-gate 160. When the operator depresses the appropriate code key, the code designating the type of trouble and the code designating the junctor circuit are sequentially inserted into the gated shift register 152. The link scanner counter 122 is now enabled by the start signal from the time slot comparator and coder circuit 159. When the selected time slot is present, and a connected link counter (allotted the selected time slot) is scanned, the AND-gate 138 enables the gated buffer to accept information. The information for identifying the particular link counter 100(1) – 100(N) is received from the link scanner counter 122. The information for identifying the particular cross-point connected to the matrix port is received from the link counter via the enabled gates 106–112. This information is transferred into the shift register 152 and then is serially stepped out of the register to the printout device 170 via the enabled gates 164 and 172.

This procedure is repeated for each link counter 100(1) – 100(N) in each of the matrix stages in the telephone switching network that were used in making a common connection or path through the network so that each link and cross-point are identified. The information from the printout device 170 will include a code for signifying the type of trouble, followed by data identifying the junctor circuit, matrix port or link and each cross-point used in making the connection. The maintenance men can now merely observe the data from the printout device and will be directed to the particular cross-points in question. The same information can be used to set up the same call conditions at a later time by selecting the same junctor circuit and setting up the same link counters 100(1) – 100(N) to the data in the printout. There is no need for a step-by-step trial testing for locating the source of the fault as required in the prior art. All the components used in completing a connection are readily identified by the printout. All the information to locate the source of the problem is provided. The procedure to locate the exact source merely requires a process of checking the individual cross-points specified. As can be seen, the procedure for maintaining common control systems is greatly simplified. Information regarding faulty connections is readily available in the event that a connection should fail to be completed and/or after the connections are completed. By having the information readily available after the connection is completed, various poor telephone connections, such as those exhibiting excessive hum, cross talk, etc., can be quickly located and very simply reconnected at a later time for test purposes.

In the event the system of FIG. 2 is to be used for traffic analysis purposes, the operator will depress a corresponding key. The traffic analysis key will condition the system of FIG. 2 for continual operation for sequentially interrogating the switching system for the cross-point connections to all the various junctor circuits. Alternatively, the system can be enabled automatically at preset periods to register the traffic load at specified intervals to establish the parameters of the main busy hour. A continuous signal will now be applied to both of the input circuits of the AND-gates 160 from the operator code key 156. The binary coder 158 will be periodically enabled to apply a code to the gated shift register 152 indicating the data is for traffic analysis. The periods between enable signals to the binary coder 158 will be sufficient to allow tests to be completed. Each time the binary coder 158 is enabled, a different one of the gates 140(1) – 140(X) is enabled, thereby sequentially changing the time slot (TS(1) – TS(X)) applied to the gated buffer circuit 128 wherein the matrix ports and the cross-points connected to each junctor circuit in various matrix stages will be sequentially identified. The system will continue printout data of the cross-point connections made to the various junctor circuits until stopped by the operator by releasing the traffic analysis key. The data from the printout will provide information as to the amount of traffic through various junctor circuits, the actual links and cross-points used in various connections, and will also provide information as to the period of time the particular connections existed. A complete analysis of the traffic through the system is available, down to the individual cross-points providing sufficient information for any congestion problem that may exist.

It should be noted that the link counters have a dual purpose. In FIG. 1 the counters function to control the connections through the matrix. The same link counters in FIG. 2 provide continuous information on the particular cross-points used in the connections. This type of arrangement, wherein the same link counters provide a dual purpose, enhance the economy of such a system.

What is claimed is:

1. A method for identifying cross-points and links involved in separate connections through a matrix type switching network comprising the steps of:
providing the identity of the operated cross-points in the switching network;
allotting to the links connected by operated cross-points to form portions of separate completed connections through the network a separate timing period in a timing sequence so that each of the links forming a portion of a separate completed connection through the network are allotted the same timing period;
scanning each of the links in the network;
identifying each link being scanned;
selecting a timing period;
detecting when a link being scanned is allotted the selected timing period, and
storing the identity of the links allotted the selected timing period and the operated cross-points connected thereto.

2. A method as defined in claim 1 including the steps of:
identifying the selected timing period by detecting the position of the selected timing period in said timing sequence, and
storing the identity of said selected timing period.

3. A method as defined in claim 2 wherein the step of storing the identity of the selected timing period includes:
generating a digital code for each of said timing periods to identify separate connections through the network, and
storing said code.

4. A method as defined in claim 2 wherein:
the identity of the operated cross-points is provided in the form of a digital code;
the identity of said links is provided in a digital code, and
the identity of the timing period is in a digital code.

5. A method as defined in claim 1 wherein:
the code corresponding to the identity of the links allotted the selected timing period and the code corresponding to the operated cross-points connected to the links are stored in visible form.

6. A method for identifying cross-points and links involved in separate connections through a matrix type of switching network to telephone circuits connected to the network, comprising the steps of:
providing a digital code for identifying the operated cross-points in the switching network;
generating timing signals in a repeating timing sequence;
designating the telephone circuits with separate ones of said timing signals;
designating the links of said switching network connected by operated cross-points to form separate connections through the network to a telephone circuit, with the timing signal of the telephone circuit connected to the links;
scanning the links in the switching network;
generating a separate digital code for each of said links;
generating a separate digital code for the timing signals;
detecting when a link being scanned is designated by a timing signal of a selected telephone circuit, and
storing the digital code of the timing signal of the selected telephone circuit and the digital codes of the links and cross-points involved forming a connection through the network to the selected telephone circuit.

7. A method as defined in claim 6 including the steps of:
providing a visual indication of the stored digital codes.

8. Apparatus for identifying components involved in separate completed connections through a matrix type switching network comprising:
memory means for providing data for identifying each of the operated cross-points in the switching network;
circuit means for assigning the same timing period, from a repeating timing sequence, to the operated cross-points that are involved in completed separate connections through the network;
storage means for receiving data from said memory means, and
detection means for locating the cross-points assigned a selected timing period and transmitting data from said memory means to said storage means identifying the cross-points assigned the selected timing period.

9. Apparatus as defined in claim 8 wherein:
said memory means includes a separate memory for each link connected to each of the matrix switches wherein said separate memory controls the actuation of the matrix switch cross-points connected to said links;
said circuit means assigns said memories actuating cross-points completing a separate connection through the network with the same timing period;
including circuit means for selecting one of said timing periods, and
said detection means sequentially scans said separate memories to enable the memories assigned said selected time period to transmit the data stored therein to said storage means.

10. Apparatus as defined in claim 10 wherein:
said detection means includes circuit means for applying data to said storage means for identifying the separate memories assigned said selected time period.

11. Apparatus as defined in claim 11 including circuit means for identifying the timing sequence of selected timing periods and applying data to said storage means for identifying the timing period.

12. Apparatus as defined in claim 11 wherein:
said storage means comprises a register connected to apply data to a visual display device, and
said detection means includes a control circuit for enabling data to be transmitted to said register when a memory circuit being scanned is assigned the selected timing period.

13. Apparatus as defined in claim 10 wherein:
each of said separate memories includes a separate counter circuit wherein the count in said counter circuits controls the cross-point being switched.

14. In a telephone system for interconnecting a plurality of input lines through a telephone matrix-type switching network and junctor circuits, apparatus for identifying the cross-points in the switching network involved in connections through the network comprising:
a plurality of counter circuits, associated with each matrix switch in the matrix switching network, for identifying cross-points involved in connections, in a digital code;
storage means for receiving data concerning links and cross-points involved in connections;

gating means for each of said counter circuits for transmitting data from said counter circuits to said storage means;

a generator for generating a series of sequential timing signals in a repeating sequence;

circuit means for designating each of said junctor circuits with separate timing signals;

circuit means for applying a timing signal to a gating means when its associated link is connected to a junctor circuit, said timing signal corresponding to that designating the connected junctor circuit;

scanning means for periodically scanning the gating means in sequence;

circuit means for applying a digital code to said storage means for identifying individual links as said gating means are scanned, and circuit means for recognizing when a gating means simultaneously receives a selected timing signal and a scanning signal for enabling the storage means for receiving the digital code identifying the links and the cross-points connected to the junctor circuit having said selected timing signal.

15. Apparatus defined in claim 14 including:

means for applying a digital code to said storage means for identifying separate timing signals when selected.

16. Apparatus as defined in claim 14 including:

means for applying a digital code to said storage means for identifying the junctor circuit having said selected timing signal.

17. Apparatus for identifying the cross-points involved in separate connections through a matrix-type switching network providing plural paths for interconnecting circuits connected to opposite ends of the network, said apparatus comprising:

means for separately identifying all the operated cross-points in the network;

means for assigning to each connection through the network and the operated cross-points that form the connection a separate time period in a timing sequence so that the cross-points forming a connection are assigned the same time period as that assigned to the connection, and means for determining which cross-points are assigned the same time period.

18. Apparatus as defined in claim 17 wherein:

said means for separately identifying the operated cross-points continuously provides the identity of the cross-points while the cross-points are operated.

* * * * *